United States Patent Office 2,804,965
Patented Sept. 3, 1957

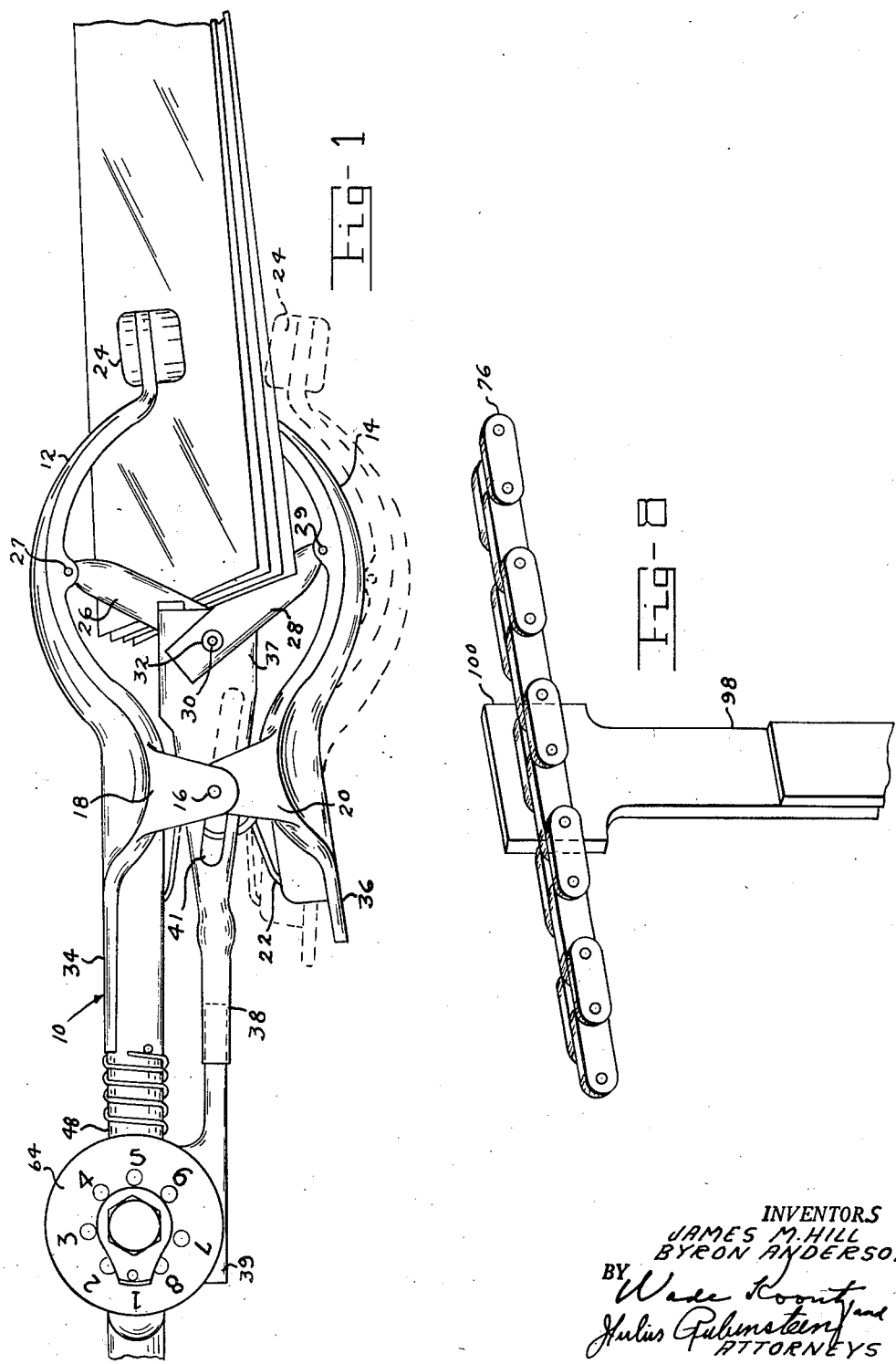

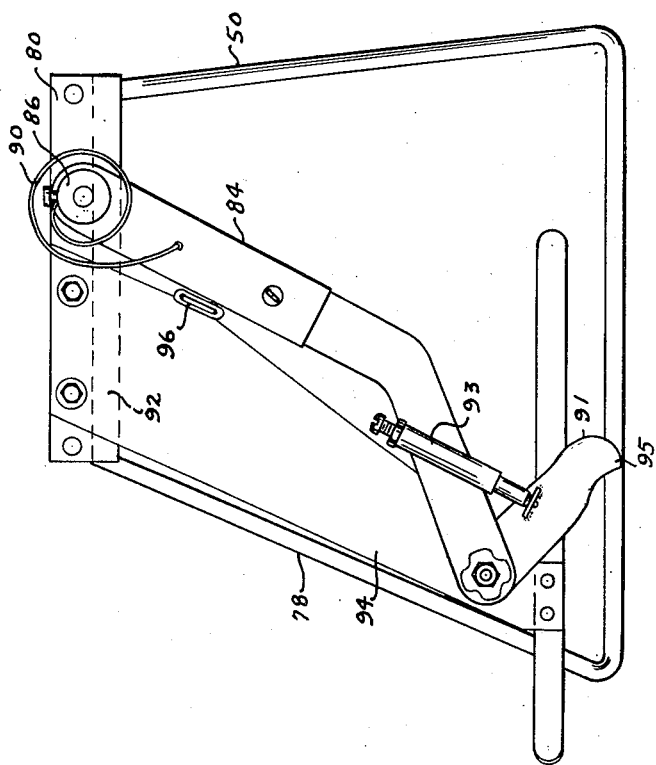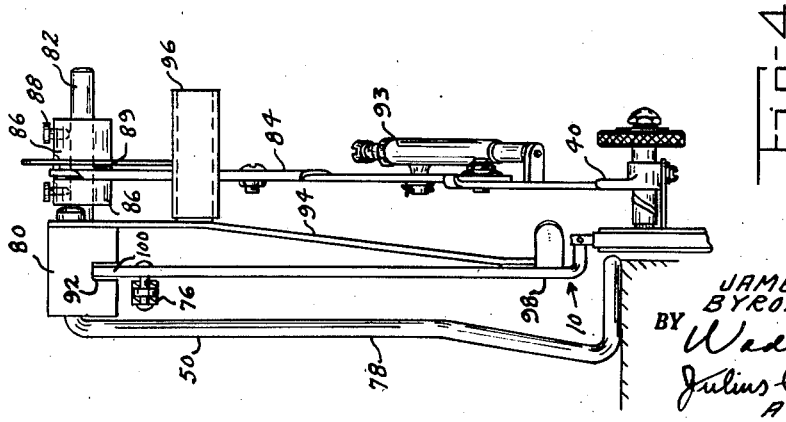

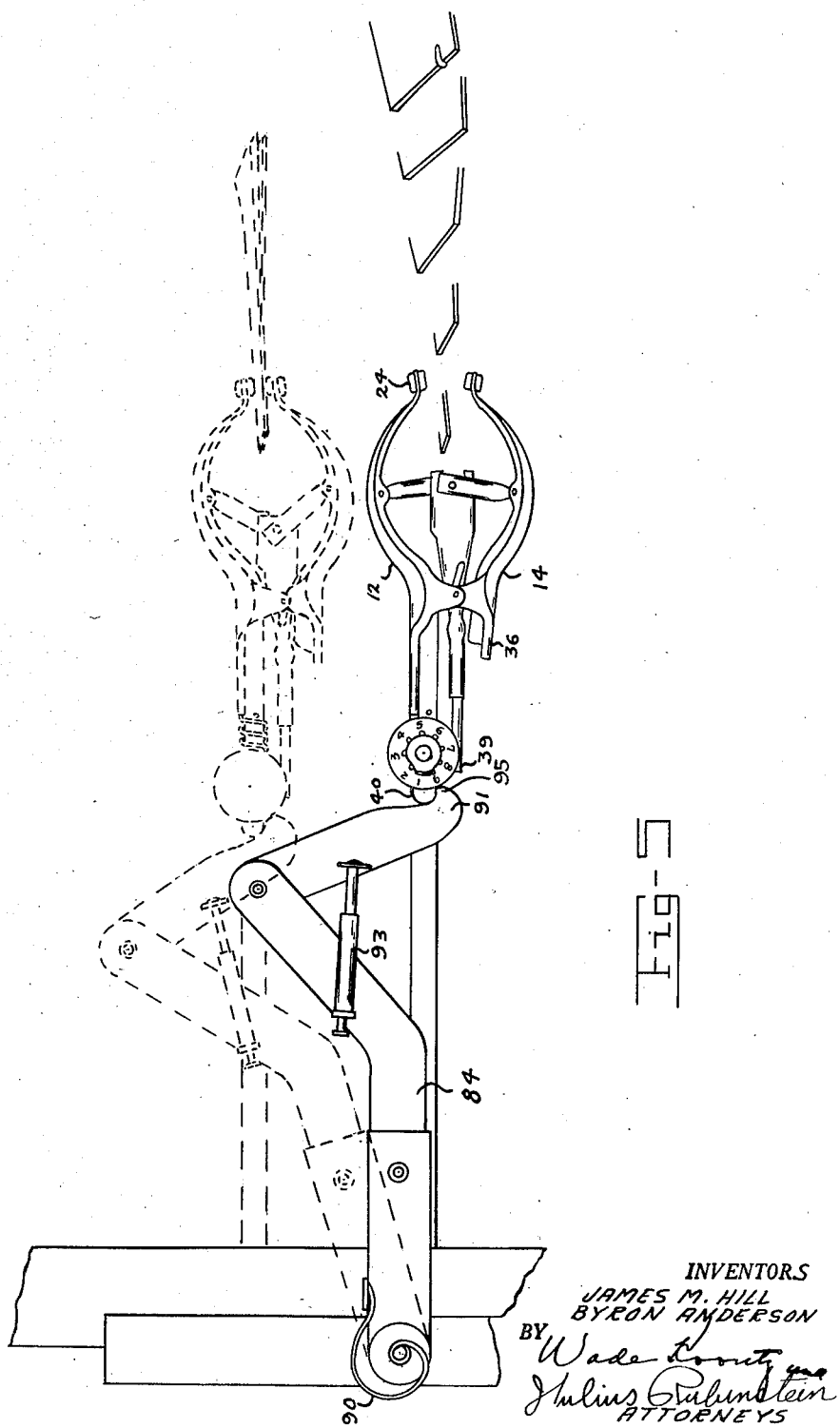

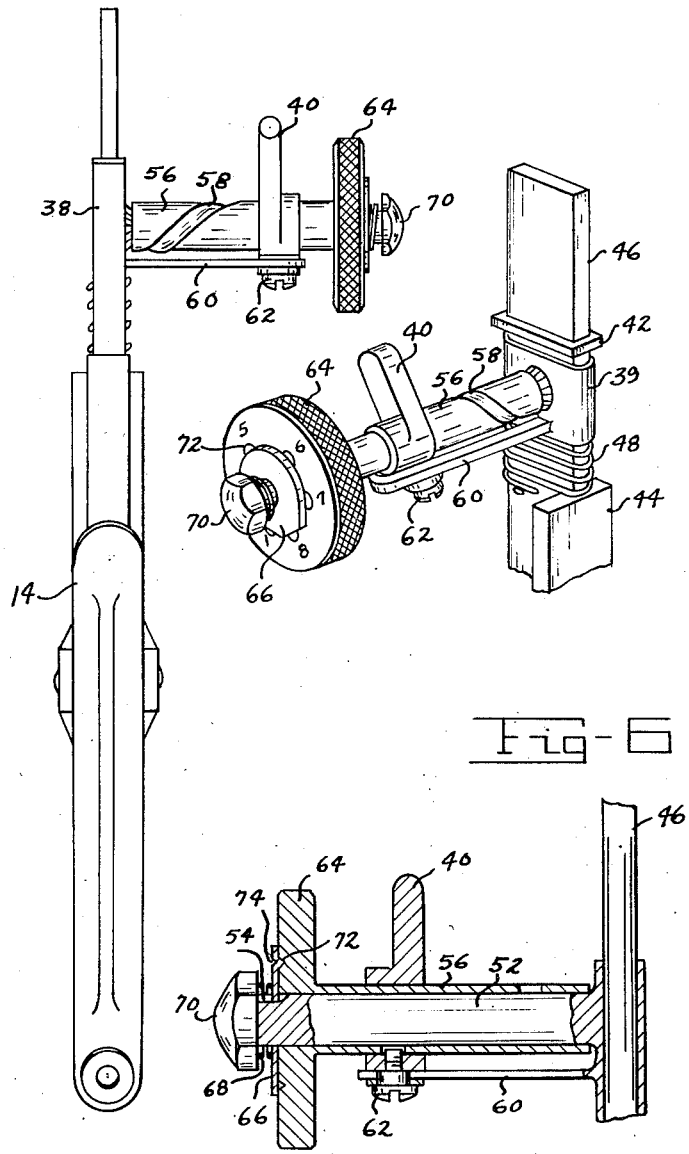

2,804,965

CORRESPONDENCE CONVEYOR WITH STATION SELECTOR TO DROP CORRESPONDENCE AT A DESIRED STATION

Byron Anderson and James M. Hill, San Antonio, Tex.

Application February 10, 1956, Serial No. 564,837

6 Claims. (Cl. 198—38)

(Granted under Title 35, U. S. Code (1952), sec. 266)

The invention described herein may be manufactured and used by or for the United States Government for governmental purposes without payment to us of any royalty thereon.

This invention relates to a correspondence conveyor and, more particularly, to a correspondence conveyor having correspondence carriers adapted to selectively discharge correspondence at various locations.

Correspondence conveyors of the past comprised an endless driven belt. A plurality of correspondence carriers was mounted on the belt and a plurality of correspondence-receiving stations was positioned along the belt. There was a particular correspondence carrier for each station. This carrier could discharge its correspondence only at its particular correspondence receiving station and nowhere else. With this arrangement, to transmit correspondence from one station to another, it was necessary to wait until the appropriate correspondence carrier for the station selected to receive the correspondence approached on the driven belt. After the correspondence was secured to this particular correspondence carrier, the endless belt moved the carrier past the various stations until it came to the station selected to receive the correspondence. Mechanisms operating on the correspondence carrier and on the correspondence receiving station then interacted and caused the correspondence to be discharged. When the orbit of the endless belt, as in a large plant, was very long, the delays involved in waiting for the appropriate correspondence carrier became a serious consideration. These delays could only be shortened through the use of larger and larger numbers of duplicate correspondence carriers and, consequently, larger and more expensive correspondence conveyor systems. These problems and difficulties suggested that it would be desirable to develop a correspondence conveyor system having correspondence carriers that could discharge its correspondence at any selected station.

Accordingly, it is a principal object of this invention to devise a correspondence conveyor provided with carriers equipped with a station selector that enables the carrier to discharge correspondence at any selected station.

A further object of this invention is to devise a correspondence carrier having a triggering mechanism adapted to quickly and easily grasp correspondence.

Still another object of this invention is to devise a correspondence conveyor having a plurality of correspondence receiving stations adapted to receive the correspondence carried by the correspondence conveyor.

Still another object of this invention is to devise a correspondence conveyor that is simple to manufacture, easy to operate, and durable.

These and other objects of this invention will become more apparent when read in the light of the accompanying drawings and specification in which like reference characters refer to like parts of the several figures.

Fig. 1 is an elevational view of a correspondence carrier disclosing a triggering device which enables this carrier to grasp the correspondence and discharge it at any one of a plurality of selected stations. The dotted lines show the carrier triggered to release the correspondence while full lines show the carrier in correspondence holding condition.

Fig. 2 is a side elevational view of Fig. 1 and discloses details of an adjustable lobe on a carrier which can be positioned to engage actuating means on any preselected station causing the jaws of the carrier to open and discharge correspondence at that station.

Fig. 3 discloses a front elevational view of a correspondence receiving station and in particular shows the actuating lever on the station adapted to engage the lobe on the carrier.

Fig. 4 is a side elevational view of Fig. 3 and discloses additional details of the adjustable features of the actuating lever and its cooperation with the carrier.

Fig. 5 discloses the cooperation between the correspondence carrier and the correspondence receiving station and shows in particular the way the actuating lever engages the lobe on the correspondence carrier forcing the jaws of the correspondence carrier from correspondence holding position as shown in dotted lines to open and discharge position as shown in full lines to discharge the correspondence.

Fig. 6 is a fragmentary perspective view of a portion of a correspondence carrier showing the way the adjustable lobes can be positioned with respect to the arm on one of the jaws of the carrier.

Fig. 7 is a fragmentary sectional view disclosing the way the lobe is mounted on the lobe support of an arm of the correspondence carrier.

Fig. 8 is a detail view showing the way the correspondence carrier is connected to the endless belt.

Referring now to Figs. 1 and 8, the correspondence carrier conveyor comprises an endless driven chain or belt 76. A plurality of carriers 10 are mounted on the belt and a plurality of correspondence receiving stations 50, see Figs. 3 and 4, are disposed along the line or path of the belt. Each carrier comprises a first jaw 12 and a second jaw 14. Jaws 12 and 14 are pivotally secured together by means of a pivot pin 16 extending through ear 18 integral with jaw 12, and ear 20 integral with jaw 14. Clamp spring 22 biases the work engaging portions 24 of the jaws 12 and 14 into a closed correspondence gripping position as shown in full lines in Fig. 1 and dotted lines in Fig. 5.

A toggle triggering device is connected between the jaws. This triggering device comprises a link 26 pivotally secured at one end 27 to jaw 12 and a link 28 pivotally secured at one end 29 to jaw 14. These links are pivotally secured together by means of a common pivot pin 30 extending through pivot openings 32 on each link. A first jaw opening mechanism on the carrier comprises hand gripping extensions 34 and 36 on jaws 12 and 14. As seen in Fig. 1, when these gripping extensions are compressed together, the work engaging portions of jaws 12 and 14 separate. When the jaws are opened sufficiently far, the toggle links 26 and 28 move into an unstable position of axial alignment with respect to each other. When this occurs, these links oppose the action of biasing spring 22 connected to the jaws which tend to move the jaws into a closed work or correspondence gripping position. This axially aligned position of the links is sufficiently sensitive and unstable so that when contacted by work such as correspondence passed inwardly between the jaws 24, the force of contact on the toggle links 26 and 28 moves them out of axial alignment. When this occurs, the action of the biasing spring 22 snaps the jaws shut into a correspondence gripping position as seen in dotted lines in Fig. 5.

The carrier contains an additional jaw opening mechanism. This jaw opening mechanism comprises an elongated jaw opening rod 38, see Figs. 1 and 2. One end 37 of this rod is pivotally connected to the common pivot connection 30 of the links. The opposite end of the rod 38 is rigidly connected to lobe support 39. Pivot pin 16 rides in a guide slot 41 in rod 38. This holds rod 38 in a position to effectively actuate links 26 and 28. The lobe support 39 is reciprocably mounted between abutments 42 and 44 on arm 46 of jaw 12, see Fig. 6. A lobe 40 is adjustably mounted for lateral position changes on lobe support 39 in spaced relation to the arm 46. As can be seen from an inspection of Figs. 1 and 6, force exerted on lobe 40 in a direction that moves lobe support 39 into contact with abutment 44 on arm 46, forces rod 38 against links 26 and 28 moving them into a position of axial alignment. This motion of the rod 38 applied to these links separates the jaws and releases the work. The required force applied to lobe 40 is supplied by the interaction of the lobe 40 on moving carrier 10 with the actuating lever 84 on the correspondence receiving station 50, see Fig. 5. Spring 48, concentric with and mounted on jaw arm 46, bears against abutment surface 44 and lobe support 39. This spring urges return of lobe support 39 and rod 38 to their rest positions after their displacement due to the engagement between lobe 40 and actuating lever 84.

Integral with lobe support 39 is a shaft 52, see Fig. 7. This shaft extends at right angles to jaw arm 46 and terminates in a key slot 54 and a threaded outer end portion, not shown. A sleeve member 56 is rotatably mounted on support shaft 52. This sleeve member has a spiral groove or slot 58, see Figs. 2 and 6. Slidably mounted on sleeve member 56 is the upstanding lobe 40. Extending parallel to sleeve member 56 and in spaced relation thereto and fixed to the lobe support 39 is a slotted plate 60. Screw member 62 riding in the slot of plate 60 is threadably secured to lobe member 40 with its end penetrating the spiral slot 58 in sleeve 56, see Fig. 7. A knurled setting disk 64 is secured integral to the sleeve member 56. Rotative adjustment of disk 64 and sleeve 56 causes the lobe 40 to move along the spiral slot 58 in sleeve 56 and alters its lateral position with respect to arm 46 on jaw 12, see Fig. 6. The function of the slotted plate 60 and screw 62 is to maintain the lobe member 40 in an upstanding position substantially parallel with arm 46 at all times in order to adjust it to engage the actuating lever 84 at the station selected to receive the correspondence.

An indicator or station selector 66 is keyed on the end of shaft 52, see Fig. 7, and a spring 68 and a spring retaining member or nut 70 threadedly secured to the outer end of shaft 52 maintains indicator 66 in abutment against the disk 64. Uniformly formed in the surface of disk 64 in a circle around the axis of the disk is a plurality of numbered recesses 72, see Fig. 7. A detent 74 on indicator 66 is adapted to penetrate these recesses, see Fig. 7. The lateral adjustment position of lobe 40 with respect to arm 46 and the actuating release lever 84 at the station where the carrier will discharge its correspondence is indicated by the selected recess which is engaged by the detent 12 of the indicator 66.

A plurality of correspondence receiving stations 50 is disposed along the path of travel of the belt or chain 76, see Figs. 4 and 5 which show one of these stations. Each station comprises an upstanding support member 78, see Fig. 3. Mounted on the support member 78 is an elongated block 80. A shaft 82 projects outwardly from the block and pivotally supports an actuating release lever 84. The shaft 82 extends through an opening in the upper end portion 89 of the actuating lever 84. A pair of blocks or collars 86 is mounted on shaft 82 on both sides of the actuating lever 84 to hold the lever 84 in the desired lateral position on the shaft. Set screws 88 provide a means for varying the lateral position of lever 84 and blocks 86 on shaft 82. A spiral spring 90, see Fig. 3, is connected between actuating lever 84 and at least one block 86. It has the function of returning the actuating lever 84 to its initial rest position after engagement with lobe 40 on the correspondence carrier. The actuating lever 84 has a pivoted end portion 91 adapted to engage this lobe 40. Since lobe 40 is reciprocably mounted on jaw arm 46, the edge of end portion 91 has a depending cam surface 95 so its engagement with lobe 40 on the moving carrier forces the lobe down on jaw arm 46. The position of end portion 91 can be adjusted by means of the adjustment screws 93 on the actuating lever 84, as well as set screws 88 on blocks 86. As seen in Fig. 4, block 80 has a belt or chain guide slot 92 extending along its length. The purpose of this guide slot is to help fix the position of the endless belt and carrier 10 with respect to the actuating lever 84. In furtherance of this, an additional guide piece 94 bears against the carrier support 98 and in cooperation with guide slot 92 on block 80 maintains the carrier in its proper position. An abutment member 96 on guide piece 94 acts as a stop to keep the actuating lever 84 from pivoting through too wide an angle after its return from engagement with the lobe 40 on carrier 10. As can be seen from Fig. 8, a carrier support 98 is secured to a belt or chain 76. This support member has an upstanding guide portion 100 which is adapted to ride in guide slot 92 in block 80.

The lateral position of the actuating lever 84 on shaft 82 is adjusted to a different position for each station so that the release of lobe 40 on the correspondence carrier must be properly adjusted on sleeve member 56 in order for it to engage end portion 91 of the actuating lever 84 on the station selected to receive the discharged correspondence. The proper settings of the lobe 40, on the sleeve member 56 for the different stations are indicated by the indicia on the wheel 64 and by the detent 74 on indicator 66 which is disposed in the recess 72 on disk 64 that corresponds to the station selected to receive the discharged correspondence.

Referring now to Fig. 5, assume it is desired to convey the correspondence to a station identified by number 3, and that the jaws of the carrier have been opened to their unstable correspondence receiving position. Correspondence is first inserted between the jaws 12 and 14 of any carrier and is pressed upwardly against link members 26 and 28 sufficiently hard to break the toggle and disturb their axial alignment. This alters their unstable position and permits spring member 22 to snap the jaws together and hold the correspondence. Lobe 40 is then adjusted laterally into a position with respect to arm 46 where it will engage the end portion 91 of actuating lever 84 at the station selected to receive the correspondence. This is done by turning disk 64 until detent member 74 of indicator 66 engages the recess 72 marked with the number 3. When this is done, the moving belt will move the carrier 10 past all other stations, but when the carrier approaches station No. 3, lobe 40 will engage end portion 91 of actuating lever 84, see the dotted portion in Fig. 5. The motion of the carrier on the moving belt will pivot lever 84 with respect to shaft 82 against the action of spiral spring 90. This pivoting action exerts a downward force on the pivoted end portion 91 of lever 84 and depresses the lobe support 39 on jaw arm 46, forcing it into engagement with abutment 44. This downward motion is communicated to the jaw opening rod 38 which presses against the pivotal center between the links 26 and 28. This straightens the toggle links and forces the jaws open to release the correspondence at the desired station. In addition, the jaws remain open in their unstable correspondence receiving position. This is indicated by the solid lines in Fig. 5. Further motion of carrier 10 moves the lobe beyond the end portion 91 of actuating lever 84. Then the action of spring 90 returns the actuating lever into its rest position in readiness for engagement with the next carrier for that station.

Having thus described the invention, what is claimed as new to be secured by Letters Patent is:

1. An apparatus of the class described comprising in combination an endless belt, a plurality of carriers secured to the belt, each carrier including an opposed pair of relatively movable jaws, biasing means connected to the jaws to force the jaws into a closed work gripping position, jaw opening means connected to the jaws, said jaw opening means adapted to separate the jaws into a work releasing position, triggering means connected to the jaws, said triggering means comprising two links, one end of each link pivotally connected to a corresponding jaw, the opposite ends of each link pivotally secured together on a common pivot, said jaw opening means including means to move said links into an unstable position of axial alignment with respect to each other and keep the jaws separated against the action of the biasing means, said axial alignment sufficiently unstable so that when the alignment is disturbed, the biasing means snap the jaws together into a work gripping position stations arranged along the path of the belt, actuating means on each station adapted to engage and actuate the jaw opening means on preselected carriers, adjustable means on each carrier connected to said jaw opening means, said adjustable means adapted to position said jaw opening means on the carrier so they selectively engage the actuating means on the station selected to receive the work.

2. The apparatus set forth in claim 1 wherein said jaw opening means comprises a jaw opening rod, said jaw opening rod having one end pivotally connected to the common pivotal connection of the links, the opposite end of said rod connected to a lobe support, said lobe support reciprocably mounted on one of said jaws, a lobe mounted on said lobe support in spaced relation to said jaw and adapted to be engaged by the actuating means on the preselected stations, means connected to said lobe to move it to preselected positions with respect to said jaw in accordance with the position of the actuating means on the station selected to receive the work.

3. An apparatus of the class described comprising in combination an endless belt, a plurality of carriers secured to the belt, each carrier including an opposed pair of relatively movable jaws, biasing means connected to the jaws to force the jaws into a closed work gripping position, jaw opening means connected to the jaws, said jaw opening means adapted to separate the jaws into a work releasing position, stations arranged along the path of the belt, each of said stations comprises a support member, a shaft projecting from said support member, an actuating lever pivotally and adjustably mounted on said shaft, adjusting means for adjusting the position of said actuating lever on said shaft to correspond with a preselected position of said jaw opening means on each of said carriers so only the actuating lever on the station selected to receive the work will engage said jaw opening means to open the jaws of the carrier and release the work at the selected stations.

4. An apparatus of the class described comprising in combination an endless driven belt, stations arranged along the line of movement of the belt, a plurality of carriers secured to the belt, each carrier including an opposed pair of normally open jaws, a triggering device connected between the jaws, said triggering device comprising two links, one end of each link pivotally connected to a corresponding jaw, the opposite ends of each link pivotally secured together on a common pivot, biasing means connected to the jaws to force them into a closed work gripping position, jaw opening means connected to said links to move them into an unstable position of axial alignment to maintain the jaws in a separated position against the action of the biasing means, said position of axial alignment sufficiently unstable so that when the alignment of the links is disturbed the biasing means connected to the jaws snaps them together in a work gripping position, said jaw opening means comprising a jaw opening rod having one end pivotally connected to the common pivotal connection of the links, with its opposite end connected to a lobe support reciprocably mounted on one of said jaws, a lobe mounted on said lobe support for lateral adjustment in spaced relation to said jaw and adapted to be engaged by actuating means on the selected stations, said stations each comprising a support member, guide means mounted on said support member to position said carrier laterally with respect to said station, a shaft connected to said support member, an actuating lever mounted for pivotal and lateral adjustment on said shaft, whereby the position of said actuating lever on said shaft is settable to correspond with a predetermined position of said lobe on said lobe support so that only the actuating lever at the station selected to receive the work will engage said lobe to open the jaws on the carrier and release the work, and means connected to said lobe to move it laterally into a preselected position with respect to the jaws to correspond with the position of the actuating means at the station selected to receive the work.

5. An apparatus of the class described comprising in combination an endless belt, a plurality of carriers secured to the belt, each carrier including an opposed pair of relatively movable jaws, biasing means connected to the jaws to force the jaws into a closed work gripping position, jaw opening means connected to the jaws, said jaw opening means adapted to separate the jaws into work releasing position, triggering means connected to the jaws, said triggering means including means for holding the jaws separate against the action of the biasing means in unstable equilibrium so that when the work engages said triggering means the unstable equilibrium is destroyed permitting the biasing means to snap the jaws together in work gripping position, stations arranged along the path of the belt, actuating means on each station adapted to engage and actuate the jaw opening means on preselected carriers, adjustable means on each carrier connected to said jaw opening means, said adjustable means adapted to position said jaw opening means on the carrier so they selectively engage the actuating means on the station selected to receive the work.

6. The apparatus set forth in claim 5 wherein each of said stations comprises a support member, a shaft projecting from said support member, an actuating lever pivotally and adjustably mounted on said shaft, adjustable means for adjusting the position of said actuating lever on said shaft to correspond with a preselected position of said jaw opening means on each of said carriers so only the actuating lever on the station selected to receive the work will engage said jaw opening means to open the jaws of the carrier and release the work at the selected stations.

References Cited in the file of this patent

UNITED STATES PATENTS

| | | |
|---|---|---|
| 1,775,545 | Anderson | Sept. 9, 1930 |
| 1,781,655 | Cowley | Nov. 11, 1930 |